Figure 1:
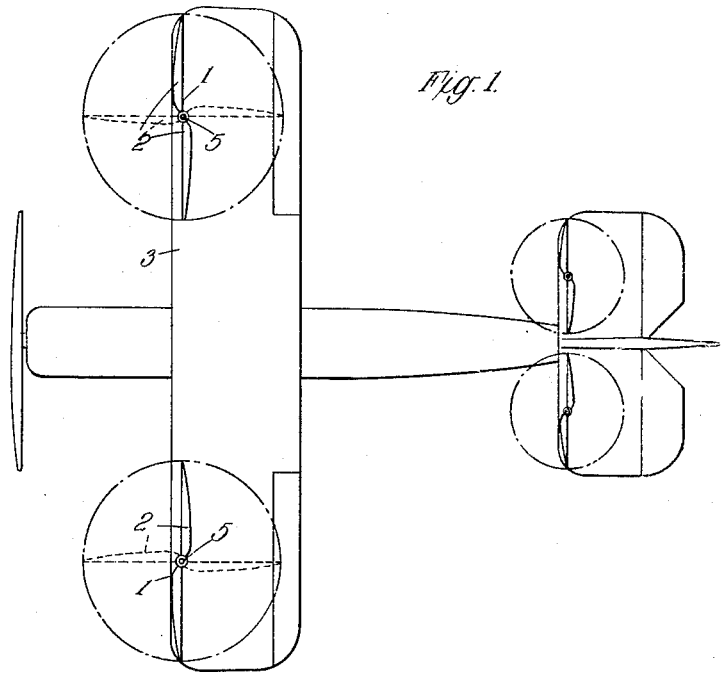

July 12, 1932.  A. P. THURSTON  1,866,869
AIRCRAFT
Filed July 20, 1929  2 Sheets-Sheet 1

ALBERT PETER THURSTON.
INVENTOR;
By Otto Munk
his Attorney

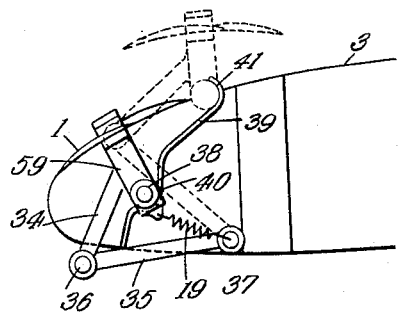
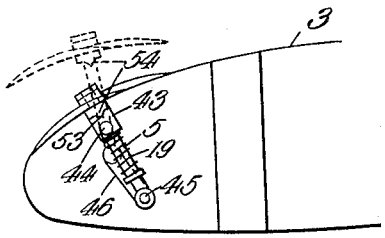
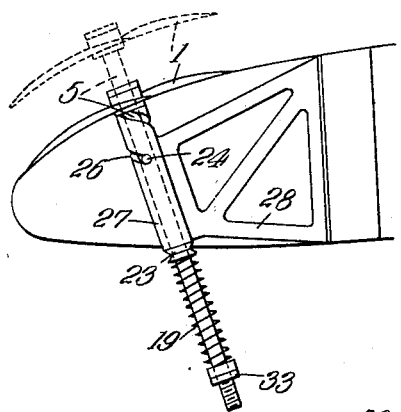
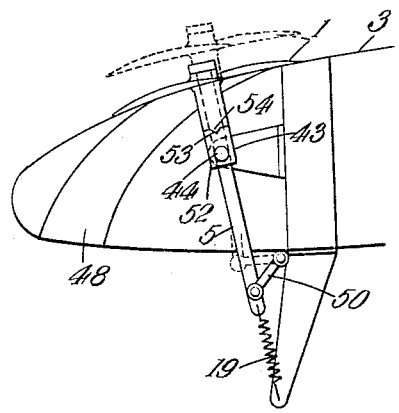
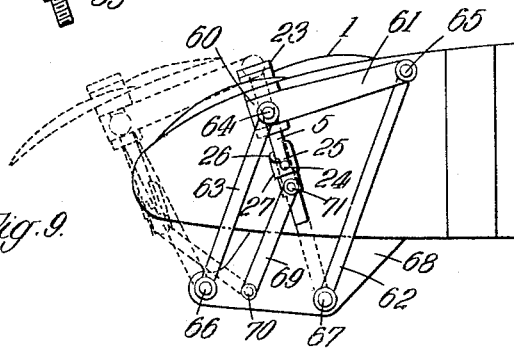

Patented July 12, 1932

1,866,869

UNITED STATES PATENT OFFICE

ALBERT PETER THURSTON, OF LONDON, ENGLAND

AIRCRAFT

Application filed July 20, 1929, Serial No. 379,667, and in Great Britain April 6, 1929.

I have found by experiments in the wind tunnel, borne out by tests with flying models, that if a small plane (hereinafter called a rider) be mounted with negative inclination upon the upper part of the nose of an aerofoil (hereinafter called the plane) moving relatively to air, the mounting being such as to permit of a movement of advance or retraction in its own or a parallel plane or substantially so, then at normal flying angles of the plane the rider will tend to retract and nest upon the nose of the plane, whilst when a certain critical angle of incidence of the plane is attained the rider will advance forwardly of the plane and this movement takes place when it has a lifting effect in relation to the air rising over the nose of the plane or in other words when the said movement of the rider deflects the air down upon the plane and thus tends to militate against burbling and to maintain the lift of the plane, or in other words the normal aerodynamical characteristics of the plane for normal angles of incidence. Thus if a rider shaped to the upper part of the nose of the plane be mounted for rotation at one end with its axis of rotation inclined forwardly from the perpendicular to the chord of the plane, at normal angles of incidence it will nest upon the nose while at the critical angle it will swing out at an angle to the leading edge.

If then this movement of a rider in relation to the plane can be rendered continuous at an excessive or what is normally a stalling angle for the plane, stalling can be prevented and the lift of the plane maintained. A convenient way of effecting this is to give the rider a two bladed helical formation by shaping its opposite blades to nest upon different zones of the upper surface of the nose parallel with the leading edge of the plane, and to mount it upon the plane at a point intermediate its ends upon an axis inclined forwardly from the perpendicular to the chord of the plane. With such a disposition, as the angle of incidence of the plane is increased the blade which has a normal negative angle of incidence, or the greater negative angle of the two, will swing out to set the rider at an angle to the leading edge of the plane and the rider will finally rotate automatically in continuation of this movement as the angle of incidence increases. This is equivalent to saying that a rider having fixed blades with right handed pitch will auto-rotate in clockwise direction as seen from above, while a rider with left handed pitch will auto-rotate in the opposite direction.

As the critical angle is approached there is also a tendency of the rider to lift bodily away from the plane and this may be utilized to lift the rider clear and prevent its striking the plane during rotation. When the angle of the main plane decreases and the axis of rotation of the rider slopes more and more forward, auto-rotation eventually ceases and on the movement being continued auto-rotation tends to take place in the reverse direction and the rider to drop down on to the plane. Various means, examples of which are given hereinafter, may be provided for preventing damage when the rider falls back and for ensuring its nesting on the nose of the plane in the desired normal position.

Using a plane of a standard aerofoil section with a rotatable rider of the kind described with its axis of rotation inclined forwardly from the perpendicular to the chord of the plane at an angle of about 10 or 15 degrees, I have found that at the normal stalling angle of the plane the rider auto-rotates and the lift of the combination is actually greater than the maximum lift of the plane alone, due no doubt to the large mass of air engaged by the blades in rotating, and the stalling angle may be delayed as much as 20 degrees or more according to the length, shape and number of the riders. Thus an aeroplane having the wings provided with a rider or riders mounted as described could be landed at a very low speed and steep angle. I have also found that the character of the lift and drift curves of the combination may be varied by altering the inclination of the axis of rotation of the rider and that a construction and disposition may be provided which will allow the rider to remain nested upon the aerofoil until the stalling angle is reached, then to open and form a gap to prevent the aerofoil stalling for a few more degrees, and finally to come into auto-rotation still further to delay the stalling angle and to increase the lift.

I have also found that a two-bladed rider can be carried on the plane with small drag if the blades are in line with the direction of flight, that is to say transverse to the length of the plane and parallel to the chord, and that a rider so mounted will rotate in a lifting direction as aforesaid, if free so to rotate, when the plane is at a large angle.

I have also found that if a rider plane with blades of helical formation is mounted upon any other part of a fixed plane, such as the rear edge, so as to turn about an axis transverse to the surface of the fixed plane, it will auto-rotate in a lifting direction at certain angles of the fixed plane and the character of the lift and drift curves of the combination may be varied by altering the inclination of the axis of rotation of the rider.

The object of the invention is to apply these discoveries for the purpose of improving the lift, the stability and the control of aircraft, and particularly to provide aircraft with means automatically to prevent stalling and to facilitate landing by making slow flight possible.

Broadly stated therefore the invention consists in the combination, for the supporting or controlling surfaces of aircraft, of a fixed plane and a movable rider or riders mounted in association therewith, preferably in the vicinity of the leading edge, in such manner that when a certain angle of incidence of the plane is reached the rider or riders sweep automatically forward, preferably over the nose and outwardly from the leading edge, in a lifting direction in relation to the air rising over the nose or passing over the plane, or in a direction such as to deflect the air on to the surface of the plane.

More particularly it consists in the combination, for the supporting or control surfaces of aircraft, of a fixed plane and a rotatable rider with blades of helical formation so constructed, mounted and provided with guiding or controlling mechanism that the rider closes or nests upon the surface of the nose of the plane at low angles of incidence and automatically lifts and comes into rotation in a lifting direction in relation to the air rising over the nose or a direction which deflects the air on to the surface of the plane, at large angles of incidence.

Examples of ways of carrying the invention into effect will now be described with reference to the accompanying drawings, in which,—

Figure 1 is a plan view of an aeroplane showing in general a disposition of rotatable riders on the aerofoils thereof, and Figures 2–10 inclusive show various constructions for the mounting, guiding and controlling of the rotatable riders.

Reference will first be made to Figure 1 which is a plan view of an aeroplane showing in general a disposition of rotatable riders on the aerofoils thereof. Two riders or rotors 1 having blades 2 are mounted upon the top surface of the main plane 3 in the vicinity of the leading edge, and are capable of rotation about the axes 5 transverse to the plane 3 and the blades 2. The riders are given a screw formation by shaping the blade on one side of the axis of rotation to one strip of the upper surface of the nose of the plane parallel to the leading edge, and the blade on the other side to another strip parallel to the leading edge as shown in the figure. It will be appreciated therefore that due to the curve of the usual wing section at the nose, the rider on the port side will have a right hand screw formation and that on the starboard side a left hand screw formation, and under the conditions hereinbefore referred to, the port rider will rotate in clockwise direction and the starboard rider in anti-clockwise direction as seen from above, the blade which is outermost sweeping forward in the direction of flight.

As an alternative way of imparting a screw formation to the rider the blades may be shaped to the surface of the main plane along a line inclined to the leading edge. Or, they may have the usual formation of an air screw. It is preferred however to shape them to the surface of the plane in order that they may nest thereon as hereinbefore referred to and as is set forth in connection with various methods of mounting and guiding the riders hereinafter described.

The axis of rotation 5 of the rider is preferably in a plane at right angles to the longitudinal axis of the main plane 3 and may be inclined forwardly from the perpendicular to the chord of the plane according to the nature of the lift and control desired. The rider may be mounted so that its plane of rotation is permanently clear of the upper surface of the wing and it may be mounted upon any part of the said wing, but preferably it is so mounted and guided, in a manner of which examples are hereinafter described, that in flight at normal angles of incidence it nests upon the upper surface of the nose of the wing, whilst at large angles of incidence the rider lifts so that its plane of rotation is above but in proximity to the upper surface of the wing.

Similar riders 1 are shown as mounted upon the fixed tail plane 4 and the foregoing description applies also to these.

Various methods of mounting the rider upon the aerofoil and guiding and controlling its movements will now be described with reference to Figures 2–10 inclusive of the accompanying drawings.

Figures 2, 3:
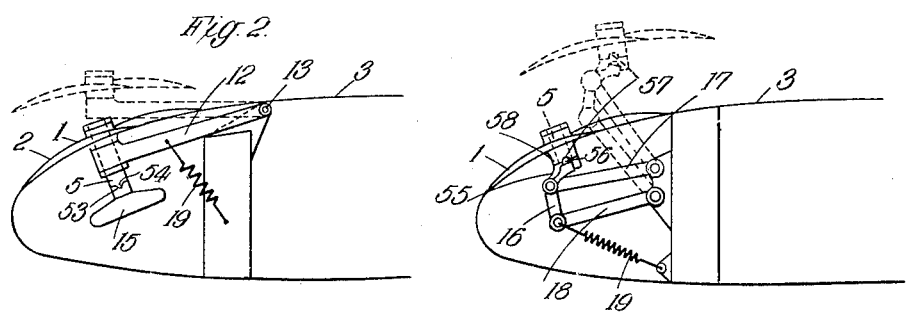

Referring to Figure 2, the rider 1 which is mounted rigidly upon its axis or spindle 5, is carried rotatably in the outer end of a link 12 which is pivoted at 13 to the main plane 3. The axis of rotation of the rider is inclined forwardly from the perpendicular to the chord of the plane, as shown. In the lower or closed position the rider nests upon the nose of the wing as shown in full lines and the lower end of its spindle 5 rests upon a stop 15. Any convenient form of stop (not shown) is also provided to limit the movement of the rider to the open position shown in dotted lines, and it will be noted that the forward inclination of the axis is reduced as the rider opens. The disposition is such that at normal flying angles the air force acting upon the upper surface of the rider maintains it closed, although the moment of this force about the pivot 13, and tending to maintain the rider closed, is comparatively small. When the plane reaches or approaches the normal stalling angle the rider opens to form a gap between its blades and the nose of the wing which has the effect of delaying stalling and if the angle of incidence of the plane continues to increase, the rider commences to rotate in a lifting direction, still further to delay stalling and to increase the lift.

As the angle of incidence of the plane decreases the tendency of the rider to rotate in the lifting direction first decreases, and then ceases and finally the tendency is to rotate in the non-lifting direction and the wind force on the upper side of the rider causes it automatically to close down upon the nose of the plane.

In order to prevent the rider blades from striking the surface of the plane while rotating and to ensure the blades finally nesting upon the nose of the plane with the blades parallel to the leading edge, the stop 15 is provided with a notch 53 adapted for engagement by a similarly shaped tooth 54 on the lower end of the spindle 5 when the blades are in nesting position. By this means rotational movement of the rider cannot take place without the latter being lifted clear of the main plane. Moreover any damage is prevented in the case of the rider closing while rotating with a high degree of momentum as the tooth 54 will successively drop into and rise out of the notch 53 until the momentum decreases sufficiently for the final engagement of these elements to take place without undue shock. The wind force alone may be relied upon to close the rider but if desired a retractile spring 19 may be provided to provide certainty of action.

In the construction shown in Figure 3, the rider 1 is mounted for rotation upon a spindle 5 fixedly mounted in a block 55 which is an integral part of a member 16. The latter is connected by links 17, 18 to the main plane 3. The axis of rotation is inclined forwardly from the perpendicular to the chord of the plane and the linkage shown will have the effect of lessening this forward inclination as the rider opens. By simple variation of the linkage the inclination of the axis to the perpendicular to the chord of the main plane may be maintained constant, or it may be caused to increase as the rider opens so as to increase the negative angle of incidence of the rider. Thus for example the latter condition may be attained, having regard to the construction shown in this figure, by lowering the point of connection of the lower link 18 with the main plane. Upon the upper link 17 a spring loaded catch 56 is mounted adapted to engage in a notch 57 in the boss 58 of the rider when the latter is disposed with its blades parallel with the leading edge of the plane. A spring 19 may be provided to assist in closing the mechanism.

Figure 4:
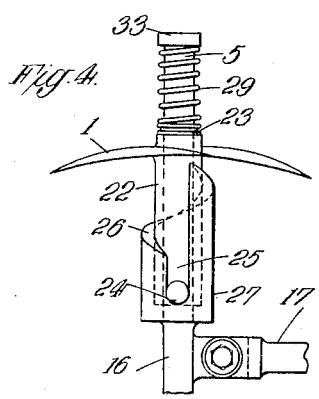

Figure 4 shows a modified arrangement for mounting the rider which may be applied for example in a construction employing linkage such as described with reference to Figure 3. In this modification the rider 1 is provided with a sleeve 22 capable of rotational and sliding movement on a fixed spindle 5 which projects upwardly from the centre of the base of a block 27 of generally hollow cylindrical shape. This block 27 is rigidly mounted on the part 16 corresponding with the member 16 of Figure 3, 17 indicating the upper link of a linkage similar to Figure 3. The sleeve 22 has a pin 24 projecting from the side and adapted to engage the slot 25 and helical surface 26 of the block 27. The slot prevents rotation of the rider until it has risen some distance from the main plane, and the helical surface 26 throws it well clear of the main plane when it begins to rotate in the lifting direction. The helical surface also acts to guide the rider to the nesting position when, on the angle of incidence of the main plane decreasing the rider commences to close down on to the plane. The rider lifts from the block 27 against the action of a spring 29 interposed between the head 33 on the fixed spindle 5 and a ball race 23, the latter permitting the rider to rotate freely notwithstanding the spring pressure. This spring also acts to return the rider when the angle of incidence of the main plane decreases as hereinbefore mentioned.

Figure 5:
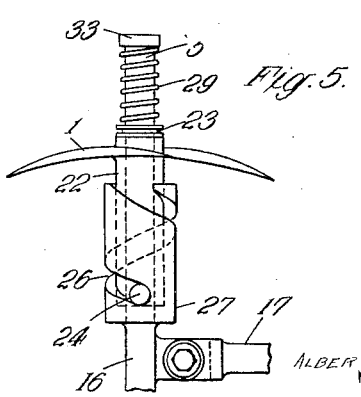

Figure 5 shows a modification of Figure 4. In this modification the block 27 is provided with a single turn helical slot 26 and the straight slot 25 of Figure 4 is dispensed with. The helical slot is engaged by the pin 24 on the sleeve 22 of the rider and the disposition is such that rotation of the rider in the lifting direction raises the rider clear of the plane and rotation in the nonlifting direction causes the pin to travel down the slot and the rider to nest upon the nose of the main plane.

Figure 6 shows another construction wherein again the normal forward inclination of the axis of rotation of the rider is decreased when the rider opens. The rider 1 is mounted for rotation in a bearing block 59 at the end of a chain of two links 34, 35 which are pivoted together at 36 the link 35 being pivoted to the main plane at 37. The block 59 is provided with rollers 38 adapted to engage a guide 39 designed to guide the block 59 upwardly and rearwardly as the rider lifts and the links 34, 35 straighten out. The lower part of the guide is provided with a steep sided recess or notch 40 which permits the rider to drop and nest upon the nose of the plane and ensures its rising from the nose at the beginning of the opening movement and before it commences to rotate. At the upper end 41 the guide bends round to form a stop limiting the upward movement of the rider, and a retractive spring 19 is provided to assist or ensure the closing down of the rider.

Figure 7 shows yet another construction in which the forward inclination of the axis of rotation is decreased when the rider opens. The rider 1 is rotatably mounted upon a spindle 5 which is slidable in a block 43 connected to the main plane by trunnions 44. The spindle 5 has a T-shaped head upon which are mounted rollers 45 running in fixed inclined guides 46. A spring 19 is provided tending normally to keep the rider in closed position but against the action of which it can rise when the plane is at a large angle as hereinbefore described, the spindle 5 sliding through the block 43 during this movement. The hub 55 of the rider is provided with a tooth 54 and the trunnion block 43 with a notch 53 similar to the like elements of Figure 2 and for a similar purpose.

In the preceding Figures 2–7 inclusive, constructions have been shown in which the normal forward inclination of the axis of rotation of the rider is decreased when the rider moves to open position while certain possible variations of this condition were described in connection with Figure 3.

Figure 8 shows a construction in which the direction and the inclination of the axis of rotation of the rider in relation to the main plane are invariable. The rider 1 is mounted rigidly upon a spindle 5 and the latter is mounted for rotation and sliding in a fixed bored block 27 carried by a bracket 28. The spindle is provided with a projecting pin or lug 24 and the block 27 with a one-turn helical slot 26, similar to the like parts of Figure 5 and for a similar purpose. 19 is a spring in compression between a ball race 23 and a nut or head 33 on the lower end of the spindle, this spring tending to close the rider down on to the plane but being sufficiently weak to permit opening when the plane is at a large angle as hereinbefore described.

Figure 9 shows another construction wherein the rider moves upwardly from the surface of the nose of the plane and then outwardly and downwardly. The rider is mounted fixedly upon the spindle 5 which is capable of rotational but not sliding movement in a bearing 60 in the member 61. The latter has pivoted to it at 64 and 65, two links 63 and 62 respectively the lower ends of which are pivoted at 66, 67, respectively, to a fixed bracket 68 under the nose of the main plane 3. The rear link 62 is longer than the front link 63, and with the disposition shown when the rider rises as it will do when the angle of incidence of the main plane reaches a certain angle near the stalling angle, it will move outwardly also in relation to the nose of the plane and the negative inclination of the element 61 and therefore of the plane of rotation will be increased. In other words the inclination of the axis of rotation of the rider to the perpendicular to the chord of the main plane will be increased, and not decreased as in most of the preceding examples described. By this means the stalling angle of the main plane is still further increased and lift maintained at very low speeds. The block 27 with helical guide 26 and slot 25 is similar to that described with reference to Figure 4 but bored right through and traversed with a sliding fit by the lower part of the spindle 5. Pivoted to the block 27 is a link 69 the other end of which is pivoted at 70 to the fixed bracket 68. In the normal position shown the pin or projection 24 on the spindle engages the slot 26. As the mechanism opens the block 27 is pulled down the spindle relatively to the pin 24 until at a certain stage the pin is quite free of the block and its final position is shown in the dotted lines. Free rotation of the rider is thus prevented until the latter is clear of the plane.

In the modification shown in Figure 10 a rider 1 nests on the main plane 3 at the upper end of a slot or passage 48 formed therethrough at a negative angle. The rider is mounted rotatably upon the spindle 5 and the latter passes with sliding fit through a bearing block 43 mounted by trunnions 44 in a bracket 49 fixed to the main plane. The lower end of the spindle 5 is pivoted to a link 50 which in turn is pivoted to the main plane. The rider has a tooth 54 and the trunnioned block 43 a notch 53 similar to the like elements of Figure 2 and for a like purpose. A spring 19 is provided tending to return the rider to the nesting position. The suction at the top of this slot and pressure below will cause or assist the lifting of the rider from the plane when the latter reaches a large angle of incidence.

This invention has now been described in general and with reference to several specific examples of construction, and from this it will be clear that many variations and additions may be made within the nature and scope of the invention, as the following examples will show.

Thus the riders particularly described may have more than two blades. In Figure 1 the addition of the dotted lines in connection with the riders on the front of the wings indicates four-bladed riders. These may lie normally in the position shown as I have found, as previously mentioned, that the blades lying in the fore and aft direction cause very small drag at normal flying angles of the plane.

A four bladed rider may be made up of two superposed two-bladed propellers on the same axis and rotationally connected by a lost motion clutch embodied in their hubs so that the pairs nest upon each other in the closed position and space themselves angularly as a four-bladed rider when the position of the machine induces rotation.

A two bladed rider may be carried on the plane with the blades in line with the direction of flight, with means for maintaining it in this position at low angles of incidence and for freeing it for rotation at large angles of incidence of the plane.

Sundry variations in the number and disposition of the riders may be made. Thus referring to Figure 1, a rider may be mounted above the longitudinal axis of the machine in place of or in addition to the riders shown, or additional riders may be placed on each side of the said axis.

The blades of the riders may be pivoted at their roots to their hub and their upward movement about their pivots may be arranged to release means normally locking them against rotation, and spring devices or stops may be provided to limit their upward movement.

The position of the riders when not rotating or the speed of rotation may be controlled by any suitable mechanism from the cockpit by varying the inclination of small planes or rudders pivoted either to the blades or the hubs thereof.

In some cases the blades may be pivoted along their longitudinal axes to the hub and any suitable means or mechanism such as a lost motion device may be provided which will permit increase of the pitch of the blades when they move again from their nesting position, and limit the amount of the said increase.

A centrifugal governor may be embodied in the rider which is adapted to render locking means inoperative, so long as the rider is rotating at or beyond a certain speed, and to restore such means to operative condition or apply a brake or both when the speed falls below that speed. Similar means may be adapted to lock the riders in the raised position so long as they are rotating beyond a certain minimum speed.

Means operable from the cockpit may be provided to lock the riders in nesting position for manœuvring at speed or in open position to impart a parachute effect in landing at small flying speed.

An air directional device such as a spring loaded air vane as set forth in my British patent specification No. 313,419 may be provided to keep the riders in nesting position unless the speed of the machine is below normal flying speed, in order to permit evolutions at high speed under the normal control.

Means controlled from the cockpit may be provided for throwing the riders into action, for example, by rocking the linkage upon which they are mounted.

Any suitable means may be provided, which may be controlled from the cockpit, for rotating the rider into its desired nesting position when it moves back on to the plane.

Any suitable means may be provided for gearing together, or synchronizing riders on opposite sides of a machine.

Any suitable form of gravity controlled device such as a pendulum may be provided to release rider locking mechanism so that when the machine is at a dangerous angle all restraint upon action of the riders is removed.

Means may be provided for varying at will the inclination of the axis of rotation of the rider as for example by varying the point of articulation of one of the links of Figure 3 to the main plane.

Any sections type or form of fixed plane and moving blade may be used which experience shows most suitable for the purpose.

In the foregoing description I have referred to supporting or controlling surfaces for aircraft. In the claims following such surfaces will be referred to briefly as main planes since whether they be for example the main supporting wings or the tail planes they are equivalents in being main planes in relation to the rider or riders mounted in association therewith. Moreover in referring in the claims to air passing over the plane or rising over the nose of the plane is to be understood that reference is made to the movement of the air relatively to the plane during flight. Further, in referring in the claims to riders of helical formation it will be understood that this may include but is not a limitation to strictly helical form as it may include any case where a blade surface is in general inclined to a plane passing through the axis of rotation and the length of the blade.

I claim:—

1. In aircraft, the combination of a main plane and a rider of helical formation mounted for free rotation under the influence of air forces in proximity to the upper surface of the main plane about an axis transverse to the latter, whereby on rotation in the appropriate direction taking place the air passing over the plane during flight is deflected on to the surface of the plane.

2. In aircraft, the combination of a main plane and a rider of helical formation mounted for free rotation under the influence of air forces in proximity to the upper surface of the nose of the plane, whereby on rotation in the appropriate direction taking place the air rising over the nose of the plane is deflected on to the surface of the plane.

3. In aircraft, the combination of a main plane, a rider of helical formation mounted for rotation about an axis and normally nesting upon the upper surface of the nose of the plane, and means for mounting the rider upon the plane, the said means permitting a limited upward movement of the said rider to free it for rotation.

4. In aircraft, the combination of a main plane, a rider of helical formation mounted upon an axis inclined forwardly of the perpendicular to the chord of the plane and normally resting upon the upper surface of the nose of the plane, and means for mounting the rider upon the plane the said means permitting a limited upward movement of the said rider to free it for rotation.

5. In aircraft, the combination of a main plane, a rider of helical formation mounted for rotation upon an axis and normally nesting upon the upper surface of the nose of the plane and means for mounting the rider upon the plane, the said means permitting a limited upward movement of the said rider to free it for rotation and varying the inclination of the said axis during such movement.

6. In aircraft, the combination of a main plane, a rider of helical formation mounted upon an axis inclined forwardly of the perpendicular to the chord of the plane and normally resting upon the upper surface of the nose of the plane, and means for mounting the rider upon the plane the said means permitting a limited upward movement of the rider to free it for rotation and lessening the forward inclination of the axis during such movement.

7. In aircraft, the combination of a main plane, a rider of helical formation mounted for rotation about an axis and normally nesting upon the upper surface of the nose of the plane, means for mounting the rider upon the plane the said means permitting a limited upward movement of the said rider to free it for rotation and means for holding the rider against rotation until it is free of the upper surface of the plane.

8. In aircraft, the combination of a main plane having a slot provided through the nose from the under to the upper surface thereof, a rider of helical formation mounted for rotation about an axis and normally nesting upon the upper surface of the plane in proximity to the leading edge thereof and closing the upper end of the said slot, and means for mounting the rider upon the plane the said means permitting a limited upward movement to free it for rotation.

9. In aircraft, the combination of a main plane, a rider of helical formation mounted for rotation about an axis and normally nesting upon the upper surface of the nose of the plane, means for mounting the rider upon the plane the said means permitting a limited upward movement of the said rider to free it for rotation, means for holding the rider against rotation until it is free of the upper surface of the plane, and means for ensuring that in the nesting position the rider blades shall be in a predetermined position in relation to the leading edge of the plane.

10. In aircraft, the combination of a main plane, a rider of helical formation mounted for rotation about an axis and normally nesting upon the upper surface of the nose of the plane the helical formation being produced by shaping the blades thereof to different zones of the upper surface of the nose of the plane, and means for mounting the rider upon the plane the said means permitting a limited upward movement of the said rider to free it for rotation.

11. In aircraft, the combination of a main plane and a rotatable rider mounted for free rotation under the influence of air forces in proximity to the upper surface of the plane about an axis transverse to the latter in a direction to deflect the air passing over the plane on to the upper surface of the latter, the rider having blades of helical formation pivoted at the roots, the blades being normally collapsed towards the upper surface of the plane and means being provided to limit upward pivotal movement under the influence of air forces.

12. In aircraft, the combination of a main plane and a movable rider mounted thereon in proximity to the upper surface of the nose by means permitting continuous free movement under the influence of air forces of the said rider in a direction to deflect the air rising over the nose of the plane on to the surface of the latter.

13. In aircraft, the combination of a main plane and a rotatable rider mounted thereon in proximity to the upper surface of the nose by means permitting continuous free rotation under the influence of air forces of the said rider in a direction to deflect the air rising over the nose of the plane on to the upper surface of the latter.

14. In aircraft, the combination of a main plane and a rotatable rider mounted thereon in proximity to the upper surface of the nose by means permitting continuous free rotation under the influence of air forces of the said rider in a direction to deflect the air rising over the nose of the plane on to the upper surface of the latter, the rider having blades of helical formation pivoted at the roots, the blades being normally collapsed towards the upper surface of the plane and means being provided to limit upward pivotal movement under the influence of air forces.

ALBERT PETER THURSTON.